G. P. BERGEVIN.
LINE REEL.
APPLICATION FILED SEPT. 17, 1915.
1,272,361.
Patented July 16, 1918.
2 SHEETS—SHEET 2.
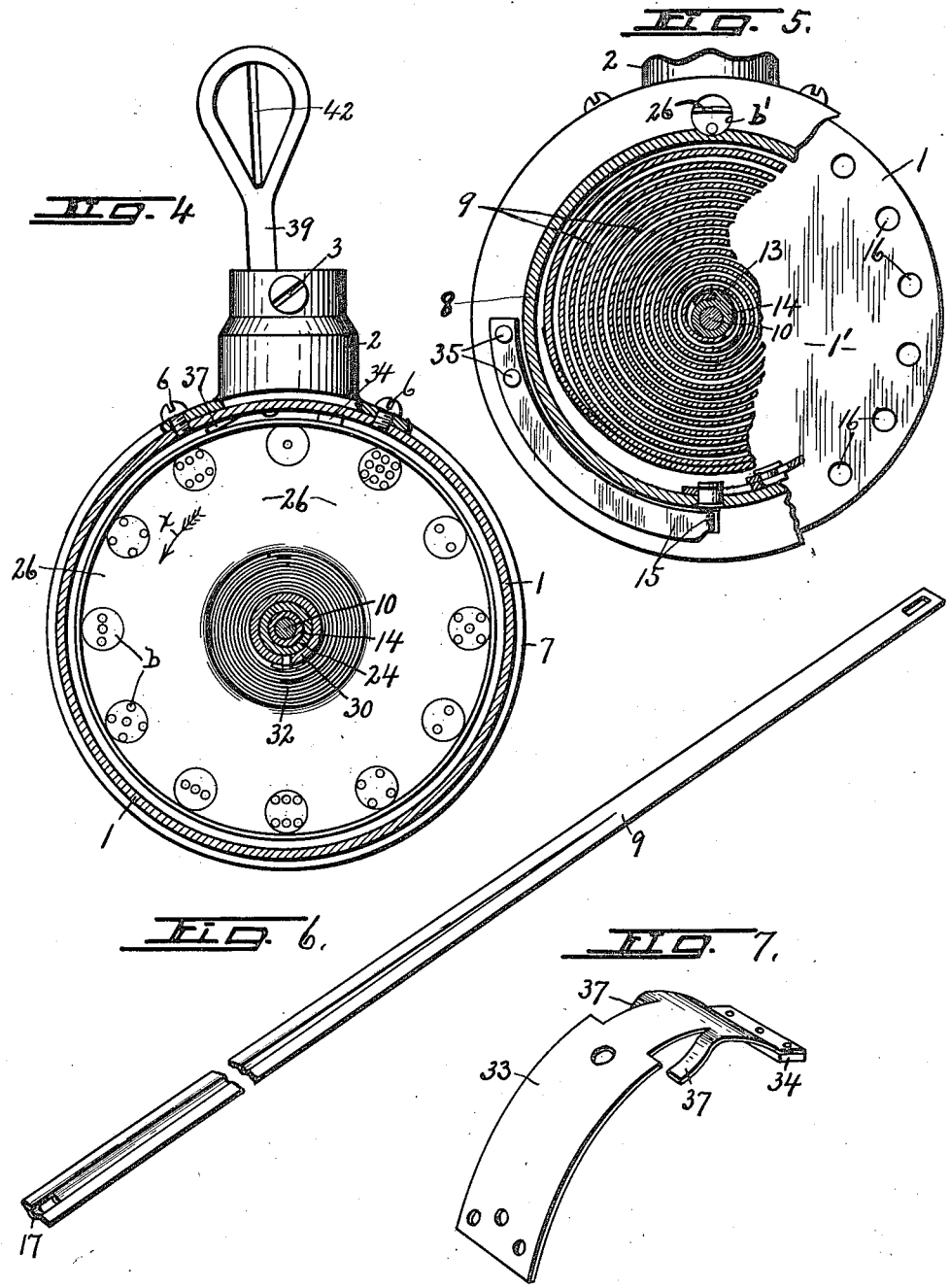

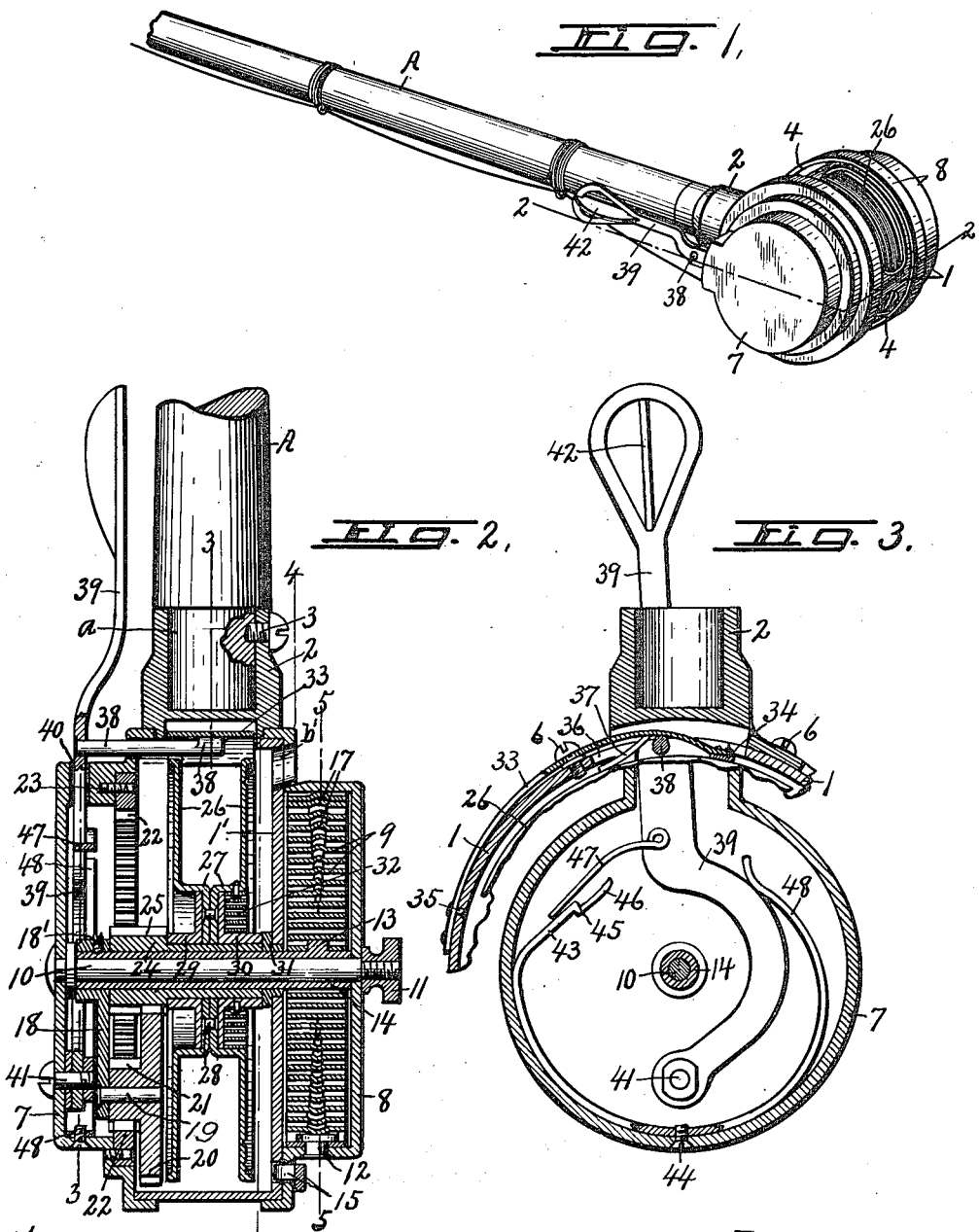

UNITED STATES PATENT OFFICE.

GEORGE P. BERGEVIN, OF UTICA, NEW YORK.

LINE-REEL.

1,272,361. Specification of Letters Patent. Patented July 16, 1918.

Application filed September 17, 1915. Serial No. 51,208.

*To all whom it may concern:*

Be it known that I, GEORGE P. BERGEVIN, a citizen of the United States, and resident of Utica, in the county of Oneida, in the State of New York, have invented new and useful Improvements in Line-Reels, of which the following, taken in connection with the accompanying drawings, is a full, clear, and exact description.

This invention relates to certain improvements in line reels adapted to be used more particularly for reeling fish lines, and involves the use of a spring motor for rotating the reel in one direction to take up the line, in combination with suitable brake mechanism operable at will to retard or release the reel.

It is obvious that in motor-driven reels of this character, the winding efficiency of the motor spring in a single operation without re-winding is necessarily limited to a more or less definite number of linear units so that when a game fish is hooked it frequently happens that the line is drawn out to a length many times the capacity of the motor to re-wind it in a single operation, thus necessitating frequent re-winding of the spring which, of course, momentarily detracts the attention of the operator and results in the loss of the fish or fouling of the line.

The main purpose of the spring is not only to keep the line taut, but also to maintain a steady pull upon the hooked game, tending continually to draw it nearer to the operator, and at the same time to obviate excessive strains upon the line by sudden dashes of the game.

The main object of my present invention is to increase the general efficiency of reels of this character.

First, by providing an auxiliary motor capable of operating the reel to continue the winding of the line thereon after the power of the main motor is exhausted.

Second, by providing a more convenient and positive brake-control for the reel in which the brake-operating member is less liable to become accidentally displaced from its normal or set positions by contact with external objects in the manipulation of the pole with the reel thereon.

Third, by providing simple means for releasing the brake and locking it in its released position to allow free operation of the reel by either the main or auxiliary motors.

Other objects and uses will be brought out in the following description.

In the drawings:—

Figure 1 is a perspective view of the handle end of a fish pole with my improved reel mounted thereon.

Fig. 2 is an enlarged central sectional view of the reel, taken on line 2—2, Fig. 1.

Figs. 3, 4 and 5 are sectional views of the same reel, taken, respectively, in the planes of lines 3—3, 4—4, and —5—, Fig. 2.

Fig. 6 is a perspective view, partly broken away, of the main motor spring straightened out.

Fig. 7 is a perspective view of the brake.

The reel illustrated is adapted to be secured coaxially to the handle end of a fish pole —A— and comprises a circular frame —1— having one side provided with a radial hollow boss —2— for receiving the reduced inner end —a— of the pole to which it is secured by a set screw —3—, said frame being made of a single piece of cast or stamped metal, preferably aluminum, and is formed with circumferentially elongated slots or openings —4— extending in opposite directions from the hollow boss —2— for the purpose of reducing the weight of the reel, the portion of the frame diametrically opposite the boss —2— constituting a connecting web which, together with the boss —2—, serves to hold the portions of the frame at opposite sides of the slots or openings —4— in fixed relation without screws or other extra fastening means.

The hollow boss —2— is, in this instance, made separate from the circular frame —1—, but is secured to the periphery thereof by screws —6—, as shown more clearly in Fig. 4.

The face width of the frame is substantially the same throughout its circumferential length and approximately equal to the diameter of the adjacent portion of the boss —2—, which latter is centrally secured thereto so that the sides of the boss are substantially co-incident with the ends of the frame.

It is now clear that when the circular frame is assembled on the end of the pole the produced axis of the pole extends diametrically through the frame.

This frame —1— is preferably cup-shape, that is one end is open and the other is closed by a flat integral plate —1'—, the open end of the frame being closed by a cap —7— having a marginal annular flange fitted upon the periphery thereof and held against turning by suitable fastening means to form with the frame —1— a suitable housing for the reel and various moving parts of the operating and controlling mechanism presently described.

A cap —8— is similarly provided with an annular marginal flange fitted upon the periphery of the closed end of the frame —1— to rotate thereon and forms with the plate —1'— a motor case or housing for a main motor spring —9—.

The caps —7— and —8— are held in operative position upon the frame —1— by means of a single co-axial bolt —10— passed through central openings in the caps and plate —1'— and having one end provided with a head engaging the outer face of the cap —7—, while the opposite end is provided with a reduced threaded portion engaged by a nut —11— to retain the cap —8— in place against outward displacement, the reduced threaded portion of the bolt forming a shoulder against which the nut —11— abuts to prevent excessive binding of the rotary cap —8—, thereby allowing the latter to be turned freely by hand for winding the motor spring —9—.

One end of this spring is secured to a suitable stud —12— in the periphery of the cap —8— and its inner end is secured to a stud or projection —13— on a sleeve —14— which is loosely journaled upon the bolt or spindle —10—, as shown more clearly in Fig. 2, the spring being wound in such manner that when the sleeve —14— is held against turning and the cap —8— is turned by hand to the right, Fig. 5, the spring will be wound up or tensioned, whereupon if the cap is held against turning and the sleeve —14— is released, the latter will be rotated in the same direction as that in which the cap —8— was turned in winding up the spring.

In order that the cap —8— may be held against retrograde movement, a spring pawl —15— is secured thereto and adapted to move into registration with any one of a circular row of apertures —16— which are formed in the plate —1'— of the frame —1— equal distances apart about the axis of the bolt —10—, the portion of the pawl —15— which enters the apertures being beveled on one side to permit it to trail over the surface of the plate —1'— when the cap —8— is rotated to the right or in the direction for winding the spring —9—, the opposite face of the pawl being abrupt to coöperate with the apertures in preventing the rotation of the cap —8— to the left, as shown more clearly in Figs. 2 and 5.

The power of the spring —9— is materially increased by stamping or pressing up the longitudinal center of the greater portion thereof, thereby producing a central lengthwise stiffening rib —17— extending from the outer end toward the inner end and gradually reducing in width and radial depth toward the inner end which is substantially flat.

The sleeve —14— to which the inner end of the spring motor —9— is attached extends from the outer wall of the motor case section or cap —8— to a point in proximity to the outer wall of the cap —7—, and upon the end of the sleeve 14, nearest the cap —7— is secured a crank arm —18— carrying a spindle —19— upon which is journaled a gear —20— and co-axial pinion —21—.

The pinion —21— meshes with an internal circular rack —22— which is secured by bolts or screws —23— to and within the cap —7—, as shown more clearly in Fig. 2.

Journaled upon the sleeve —14— is a gear sleeve —24— having a pinion —25— meshing with the gear —20—, thereby establishing connection between the sleeve —14— and gear sleeve —24—, the crank arm —18— being secured to the sleeve —14— by means of a set screw —18'— to rotate therewith in the manner and for the purpose hereinafter more fully described.

A drum or spool —26— upon which the line is adapted to be wound is loosely journaled upon the gear sleeve —24— within the circular frame —1—, and preferably consists of a pair of sheet metal disks having cup-shape hubs —27— secured together base to base by rivets —28— forming similar annular recesses in their outer faces of considerably greater diameter than that of the sleeve —24— upon which the hub is journaled for receiving a pair of collars —29— and —30— by which the drum or spool is held against endwise or axial movement, said collars being similarly held against endwise movement by a shoulder on the sleeve —24— at the inner end of the pinion —25— and a collar —31— on the sleeve —14— between the sleeve —24— and main spring —9—.

A relatively small and light auxiliary motor spring —32— is mounted in one of the recesses in the hub of the spool —26— around the collar —30—, but is wound in a reverse direction from that of the main spring —9—, and has its outer end attached to the spool and its inner end attached to the collar —30— and is adapted to be wound up or tensioned by the winding operation of the cap —8— for the main spring —9— so as to rotate the spool —26— for winding the line thereon after the power of the main spring has been exhausted by unwinding in a manner hereinafter more fully described.

The collar —30— to which the auxiliary spring —32— is attached is frictionally fitted upon the periphery of the gear sleeve —24— with a sufficient degree of friction to cause it to turn with the gear sleeve —24— for winding up or tensioning the auxiliary spring —32—, while the spool —26— is being held by the brake, presently described, and the gear sleeve —24— is being rotated by turning the cap —8— in the direction for winding up the main spring —32—, that is the friction between the collar —30— and gear sleeve —24— is sufficient to offset the tension of the auxiliary spring —32—, but allows said collar to be turned upon said gear sleeve —24— when the coil spring is wound up tight and power is applied to the spool or reel, as in the act of unwinding the line therefrom.

A self-acting brake consisting of a spring —33— having a brake shoe —34— is secured by rivets —35— to the periphery of the frame —1— and extends through an opening —36— therein so that its shoe —34— which is upon the free end of the brake spring may play in the opening —36— and engage the periphery of the spool —26—, as shown more clearly in Fig. 3, said spring —33— being provided with additional brake shoes —37— integral therewith and also engaging the periphery of the line drum or spool at a point some distance from the shoe —34—.

The portion of the spring —33— between the shoe —34— and brake springs —37— is eccentric to the axis of the spool and is engaged by a stud or pin —38— of an operating lever —39— for releasing the brake shoe —34— from its braking position when desired.

The lever —39— extends through an opening —40— in one side of the cap —7— nearest the hub —2— of the case —1— and is pivoted at —41— to said cap near the opposite side thereof; that is, the pivots —41— and brake-operating stud or pin —38— are located at opposite sides of the axis of the drum or spool so as to cause the stud or pin to swing through an arc of relatively long radius as compared with the radial distance between the axis of the spool and pin, thus causing the brake shoe to respond quickly under a slight movement of the brake-controlling lever —39—.

The free end of the brake-controlling lever extends some distance beyond the periphery of the cap —7— toward and along one side of the hub —2— and pole —A—, and is provided with a finger-piece —42— in close proximity to the handle of the fish pole, where it can be easily reached for manipulation of the pole without changing the position of the hand in holding the pole, and is also protected more or less by the pole and hand from contact with external objects.

Suitable means is provided for locking the brake-controlling lever in its adjusted position for releasing the brake and also for restoring the lever to its normal position when unlocked, the locking means consisting of a spring arm —43— secured within the cap —7— by means of a screw —44— or equivalent fastening means, and extends from one side of the cap toward the lever between the axis of the spool and pin —38—, as shown more clearly in Fig. 3, the locking member —43— being provided with a shoulder —45— and a rest arm —46— adapted to be engaged by another locking member —47— on the lever —39—, the locking member —47— being rigid on the lever —39— and also under spring tension to spring into engagement with the extension —46— and shoulder —45— when the lever —39— is rocked to its brake-releasing position.

The locking member —47— is spring tensioned against the locking member —43— and when the lever —39— is shifted from its normal position against the action of a retracting spring —48—, the free end of the locking member —47— will engage the shoulder —45— and hold the lever in such position, thereby holding the brake shoe —34— out of engagement with the periphery of the spool —26—, the spring —48— being a continuation of the spring locking member —43— and is of just sufficient tension to return the lever to its normal position when the locking member —47— is disengaged with the shoulder —45—.

This latter operation requires more power than the spring —48— and operates as follows: When finger pressure is brought to bear upon the handle —42— to trip the locking members from their locking position, the tendency of the member —47— acting against the shoulder —45— is to spring the arm —43— toward the periphery of the cap —7— which causes the extension —46— to exert a prying force against the member —47— sufficient to trip it from its locking position, thus permitting the spring —48— to act in holding the lever in its starting position and allowing the brake shoe to assume its braking position.

The object of the brake members —37— is to maintain a certain braking effect upon the spool when the brake shoe is released so as to prevent too free action of the spool.

If desired, a portion of the spool and a part of the case may be provided with coöperative means for playing certain games similar to dice, and for this purpose one face of the spool or drum is provided with a circular row of indicia —b— arranged in equally spaced relation circumferentially and movable into and out of registration with a sight opening —b'— in the adjacent face of the housing, each consisting of a different number of points, any one of which is liable to register with the sight opening when the rotation of the spool ceases and the interest in the game being produced by the highest number of points registered at each stop of the spool.

The operations are as follows:

If the line is entirely or nearly wound upon the spool and both of the motor springs are unwound, the brake lever may be adjusted to release the brake, whereupon the line may be drawn out by hand, thereby rotating the spool —26— in the direction indicated by arrow —x—, Fig. 4, which will cause the winding up of the light auxiliary spring —32— until it has reached its maximum degree of tension, whereupon the brake may be applied to hold the reel against the action of said spring, but if released would allow the spring to rotate the spool for rewinding the line thereon.

If, however, the operator continued to play the line out after the light spring was wound up as tightly as possible, it would tend to wind up the main spring —9— until the resistance of said main spring exceeded that of the friction between the collar —30— and gear sleeve —24—, whereupon the collar would simply slide on said sleeve and allow the line to be drawn out to any degree of length after the main spring had been wound to its maximum degree of tension, it being understood that the friction between the collar —30— and sleeve —24— is sufficient to offset such tension and to permit the collar to slide only when the maximum tension of the main spring is reached, and that the brake when applied is sufficient to hold the spool against the action of the main spring as well as the lighter auxiliary spring.

It is now clear that when the line is out for fishing purposes with both springs under tension and held against the action of said springs by the brake, a fish on the line may still play out more line against the combined resistance of both springs and the brake and also against the resistance due to the friction between the collar —30— and gear sleeve —24—, but this extra draft on the line by the fish must necessarily be of short duration by reason of the fact that it is beyond the power of the fish to sustain for any long period and as soon as the pull upon the line is relaxed, the brake may be quickly released, whereupon the slack of the line will be instantly taken up by the main spring, thus drawing the fish nearer to the operator by reason of the fact that as soon as the pull upon the line and brake is released, the main spring will instantly rotate the sleeve or hollow spindle —14— and crank arm —18— thereon, thus producing a planetary motion of the pinion —21— and gear —20— around the circular rack —22— and rotating the pinion —25— and its sleeve —24— together with the collar —30— and spool —26— at high speed according to the ratio of the intermeshing gears, all of which produces a rapid winding of the line on the spool.

This winding of the line will continue as long as the main spring is under tension, or until it is completely unwound, thereby exerting continued, but resilient pull upon the hooked fish.

If a considerable portion of the line with a fish thereon still remains out after the power of the main spring is completely exhausted by unwinding, the rotation of the spool to take up the slack in the line will still be continued by the small spring —32— and, in some instances, the fish by this time will be sufficiently tired to offer little resistance, and, therefore, the small spring will generally be sufficient to bring the fish close to the operator, but if not, the operator will then have sufficient time to turn the cap —8— any number of turns necessary to keep the small spring under tension, or to wind up the main spring for the purpose of adding more and greater motive power for operating the reel until the fish is finally landed.

When a game fish is first hooked with considerable line out, the brake may be applied at will at any time when it may be necessary to check or retard the progress of the fish away from the operator and when such fish is sufficiently exhausted to allow it to be drawn in, the brake may be released and locked in its released position by simply shifting the lever —39— in the proper direction for interlocking the members —43— and —47— one with the other, thereby placing the fish under the brake influence of the motor springs which in time will be sufficient to land such fish without liability of overstraining the line.

What I claim is:

1. In a line-reeling device, the combination of a spool and a collar co-axial therewith and each rotatable relatively to the other, a motor-spring connecting the collar and spool to operate the spool, means for frictionally holding the collar against rotation under a resistance exceeding the maximum power of the spring tending to rotate it, a self-applying brake for the spool, means operable at will for releasing the brake, and means for locking the last-named means in its releasing position.

2. In a line-reeling device, the combination of a spool and a collar co-axial therewith and each rotatable relatively to the other, a motor-spring connecting the collar and spool to operate the spool, means for frictionally holding the collar against rotation under a resistance exceeding the maximum power of the spring tending to rotate it, brake-mechanism for the spool having a brake-shoe and spring brake arms engaging the spool at different points, and means for releasing the brake shoe without disengaging the brake-arms from said spool.

3. In a line-reeling device, the combination of relatively rotatable co-axial sleeves, a spring motor for rotating one of the sleeves, means for transmitting motion from such sleeve to the other sleeve, a spool, and means including a coil spring for transmitting motion from the last-named sleeve to the spool.

4. In a line-reeling device, the combination of relatively rotatable co-axial sleeves, a spring motor for rotating one of the sleeves, means for transmitting motion from such sleeve to the other sleeve, a spool, a collar frictionally mounted on the last-named sleeve to turn therewith, and a motor spring connecting the collar and spool, the friction between the collar and its sleeve being sufficient to resist the tendency of both springs to rotate such sleeve and collar relatively to each other.

5. In a line-reeling device, the combination of relatively rotatable co-axial sleeves, a spring motor for rotating one of the sleeves, means for transmitting motion from such sleeve to the other sleeve, a spool, a collar frictionally mounted on the last-named sleeve to turn therewith, a motor spring connecting the collar and spool, the friction between the collar and its sleeve being sufficient to resist the tendency of both springs to rotate such sleeve and collar relatively to each other, a self-acting brake for the spool, and means operable at will for releasing the brake.

In witness whereof I have hereunto set my hand this 8th day of September, 1915.

GEORGE P. BERGEVIN.

Witnesses:
J. CLIFFORD BARNES,
G. G. JONES.